Inventors
Donald E. Barton
Irvin J. Spaeth
By Rodney Bedell
atty.

United States Patent Office 2,729,311
Patented Jan. 3, 1956

2,729,311
BRAKE BEAM SAFETY GUARD AND GUIDE STRUCTURE

Donald E. Barton and Irvin J. Spaeth, Chicago, Ill., assignors to Chicago Railway Equipment Company, Chicago, Ill., a corporation of Illinois Application June 11, 1951, Serial No. 230,942

13 Claims. (Cl. 188—210)

The invention relates to railway brake beams and more particularly to a brake beam head and associated structure having for its main object the forming of a safety guard for the beam in the event of the failure of its normal support.

Additional objects are to provide a guide intended to maintain the angular relation between the brake beam and a wheel to which it is applied, to vary the position of the guide, and to effect prompt release of the brakes.

Figure 1:
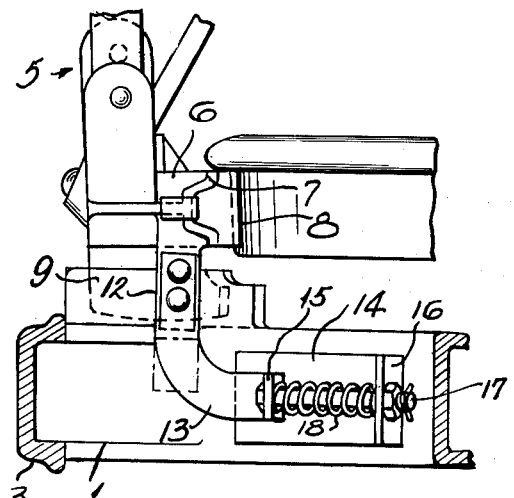

In the accompanying drawing illustrating the invention, Figure 1 is a side elevation of the central portion of a railway car four-wheel truck frame with a wheel and showing the end of a brake beam.

Figure 2:
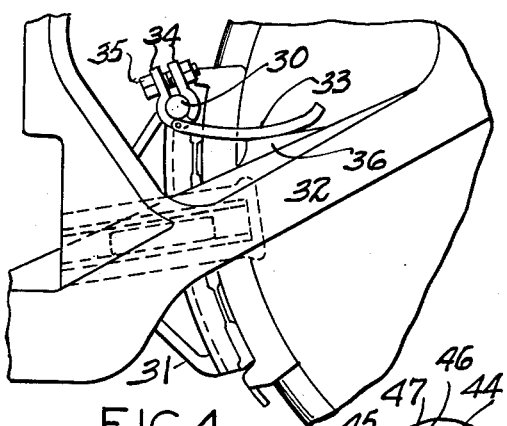

Figure 2 is a horizontal section taken on the line 2—2 of Figure 1.

Figure 3:
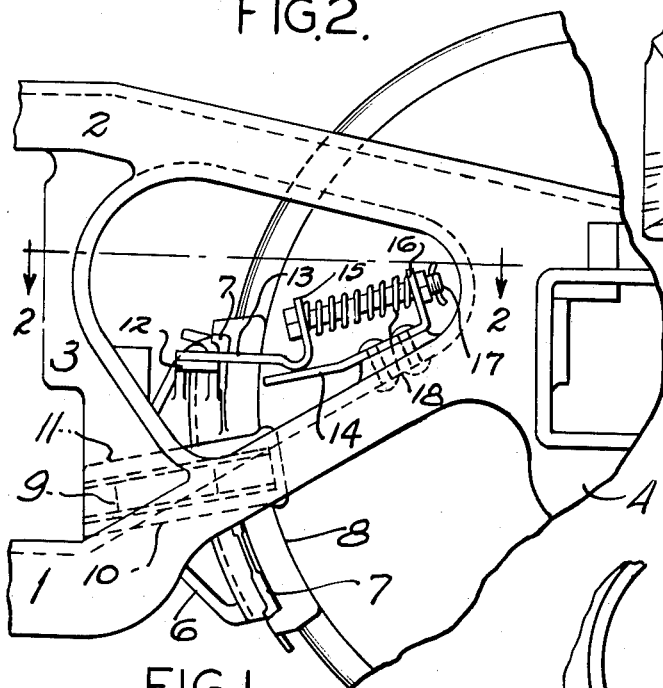
Figure 4:
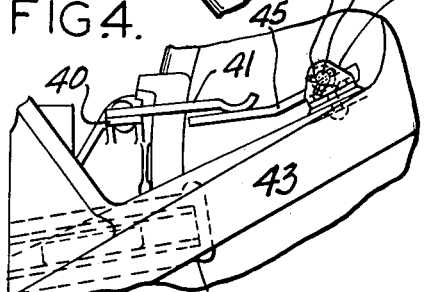
Figure 5:
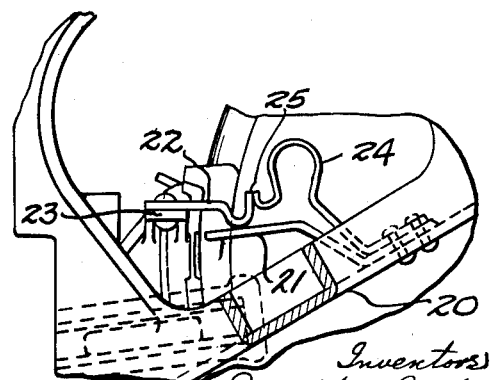

Figures 3, 4, and 5 correspond generally to Figure 1 but illustrate other forms of the invention.

The truck frame shown in Figures 1 and 2 is of the usual truss formation comprising a bottom chord 1, a top chord 2 and columns 3, the upper and lower chords converging at the ends of the frame to form the journal boxes 4 for receiving the ends of the wheel axles. The brake beam 5, only one end of which is shown, mounts at each end a head 6 of conventional contour including forwardly facing elements 7 for supporting the friction shoe 8 applied to the truck wheel. Projecting laterally from the head as a part thereof or formed on the beam independently of the head, is a lug or paddle 9 received between ledges 10 and 11 on the truck side frame to form the normal support and guide for the beam.

A bracket 12 on head 6 extends laterally therefrom beyond the vertical plane of the adjacent edges of the shoe-mounting elements and overlies the inner portion of the frame lower chord 1 so that, in the event of the failure of paddle 9 or its supporting ledge 10, bracket 12 will engage the frame and hold the beam from falling to the rail.

Preferably an arm 13 is secured to bracket 12 and extends outwardly therefrom and forwardly farther than A cooperating arm 14 is carried on the frame lower chord beneath the forward end of arm 13 and these two arms beneath the forward end of arm 13 and these two arms form a guide for the beam and cooperate with ledges 10, 11 and paddle 9 in maintaining the concentricity between the brake head and the wheel tread. Preferably, one or both of arms 13, 14 are of spring-like material so that they may yield to accommodate variations in dimensions, brake torque thrusts or other conditions affecting the relation between these elements and the position of the beam as normally determined by ledges 10, 11 and paddle 9.

As an additional feature, each of arms 13 and 14 includes an upstanding leg 15 and 16 respectively. A bolt 17 extends through legs 15 and 16 and through a coil spring 18 which tends to thrust legs 15 and 16 apart, thus serving to move the brake to released position whenever a brake thrust is relieved.

Figure 3 illustrates a structure in which the U-section lower chord 20 of the truck frame faces upwardly and the guide arm 21 is seated within the U-section, and arm 22 and the brake head bracket 23 may be positioned at a lower level than shown in Figure 1. A flat spring 24, secured to the truck frame lower chord, thrusts against the upturned end 25 of arm 22 and functions similarly to coil spring 18 to return the beam to released position.

Figure 4 illustrates another form of the invention in which the bracket 30 on the brake head 31 is a round integral lug or a stud which overlies a portion of the frame bottom chord 32. An arm 33 includes two jaws 34, pivotally assembled, and a clamping bolt 35. The truck frame is provided with a pad 36 slidably supporting the forward portion of the arm 33. Arm 33 may be rigid or resilient and is adjustable angularly on bracket 30.

In the form shown in Figure 5, brake head bracket 40 and the arm 41 thereon correspond to those shown in Figures 1 and 3, but the cooperating support structure on the truck frame 43 includes a base 44, riveted or welded to the frame, and a flat spring arm 45 detachably secured to base 44 by a removable pin 46 normally retained by a cotter 47 which is easily removed to facilitate replacement or reshaping of arm 45 to vary the point of support of element 41 from the truck frame.

The structure may be otherwise varied than as indicated without departing from the spirit of the invention and the exclusive use of those modifications coming within the scope of the claims is contemplated.

What is claimed is:

1. In combination, a railway truck side frame, a brake beam extending transversely of the frame and including a brake head, cooperating elements on the side frame and brake beam slidably supporting the beam on the frame, a device extending laterally from said head above said elements and then forwardly over a portion of said side frame to overlie said portion at a point positioned forwardly of said head and form a safety support for the beam, at least a part of said device being of spring-like material and forming a guide yieldingly maintaining a desired angular relation between the brake head and the frame.

2. Structure as described in claim 1 in which a spring is mounted on the frame and engages the forward portion of the support and guide device and yieldingly thrusts the head rearwardly.

3. A structure as described in claim 1 in which there are upstanding elements on the forwardly extending device and on the side frame, said elements being spaced apart, and a spring compressed between said elements to thrust them away from each other.

4. A structure as described in claim 1 in which the side frame portion is of U section and the support and guide device is received between the sides of the U section.

5. A structure as described in claim 1 in which the end of the support guide device is turned upwardly and a cooperating element of spring material is secured to the side frame and has an end turned upwardly and yieldingly engaging the end of said device.

6. A railway brake beam head having a body with forwardly facing shoe-mounting elements and a bracket projecting laterally from one side of the body to engage a truck part to support the head and a beam with which it is assembled, and a member of spring-like material extending forwardly from the body beyond said elements and pivotally mounted on said bracket to swing parallel to the side of the body, and releasable means holding said member against pivoting.

7. A railway brake beam head having a body with forwardly facing shoe-mounting elements and a member pivoted to the side of the body and extending forwardly therefrom and including a shiftable clamp for varying its angular relation to the body.

8. In combination, a railway truck side frame with a lower main member, a brake beam extending transversely of the frame and provided with a brake head at its end including a shoe-mounting body spaced inwardly from said side member, a bracket on said body extending over said frame member to form a safety support for the beam, and a resilient arm pivoted to said bracket and extending forwardly therefrom with its end opposing a part of said frame member to yieldingly maintain the angular relation of the beam and frame.

9. In combination with a railway truck side frame having a ledge and a brake beam extending transversely of the frame and slidably supported on the ledge, a member on the beam projecting lengthwise of and spaced above the ledge and extending forwardly from the beam and an element on the frame engaging the end of said member to maintain the angular relation between the beam and frame.

10. A railway brake beam head comprising a body having forwardly directed elements for carrying a brake shoe and having structure for slidably mounting the head on a railway truck part for its normal support, and a member above said structure extending laterally from said body and then forwardly and substantially beyond said shoe mounting elements and having a forwardly and downwardly facing terminal disposed to engage another truck part to form an auxiliary support for the head and a beam with which it is assembled.

11. A railway brake beam head as described in claim 10 in which the member forming an auxiliary support includes a vertically yielding portion adapting the member to engage the associated truck part and guide the head and the beam as the brake is applied and released.

12. A railway brake beam head comprising a body having forwardly directed elements for carrying a brake shoe and having elements projecting lengthwise of the beam beyond the head for slidably mounting the head on a railway truck part for its normal support, said head having a rigid bracket extending laterally from said body and disposed to overlie a truck part to form a safety support for the head and a beam with which it is assembled, and a yielding arm extending forwardly of the head from the outer portion of said bracket to overlie a truck part to form a guide for the head and the beam with which it is assembled during the application and release of the brake.

13. In combination, a railway truck side frame having an upwardly facing member elongated lengthwise of the frame, a brake beam extending transversely of said frame and including a brake head with shoe-supporting elements, said beam having a lug projecting lengthwise of the beam beyond said shoe-supporting elements and normally slidably supported on said member, and a device extending lengthwise of the beam beyond said head and then forwardly over a portion of the side frame to overlie said frame portion at a point positioned forwardly from said head elements and arranged to slide on said frame portion upon failure of the normal sliding support.

References Cited in the file of this patent

UNITED STATES PATENTS

| | | |
|---|---|---|
| 815,768 | Washburn et al. | Mar. 20, 1906 |
| 1,923,120 | Shafer | Aug. 22, 1933 |
| 2,226,551 | Busse | Dec. 31, 1940 |
| 2,499,549 | Walker | Mar. 7, 1950 |